(No Model.)

E. S. PEROT.
DISTRIBUTING BOX FOR ELECTRICAL CONDUITS.

No. 416,234.  Patented Dec. 3, 1889.

WITNESSES:
Gertrude Ward
A. Willis H. Ware

INVENTOR
Edward S. Perot
BY
Frans Mac Arthur
ATTORNEY

UNITED STATES PATENT OFFICE.

EDWARD S. PEROT, OF NEW YORK, N. Y.

DISTRIBUTING-BOX FOR ELECTRICAL CONDUITS.

SPECIFICATION forming part of Letters Patent No. 416,234, dated December 3, 1889.

Application filed June 29, 1889. Serial No. 316,110. (No model.)

*To all whom it may concern:*

Be it known that I, EDWARD S. PEROT, a citizen of the United States, residing at New York, in the county of New York and State of New York, have invented a certain new and useful Improvement in Distributing-Boxes for Electrical Conduits, of which the following is a full description.

My invention relates to underground conduits for electric wires or cables, and more particularly to distributing-boxes for the same of improved construction and especially designed to facilitate the passing of the wires or cables into the system. In the ordinary man-holes and distributing-boxes there is no provision made for supporting and guiding the rod or "pilot" as it passes across the same, and consequently the rod tends to diverge from its course, and often fails to enter the continuation of the conduit or duct on the opposite side of the box. In a multiple system for which my box is especially designed the rod under these circumstances frequently enters the wrong tube, to the manifest inconvenience of the operator.

My present invention is designed to overcome this special objection, and at the same time to greatly improve the general construction and arrangement of the box.

To this end my invention consists in providing the box with an "artificial bottom," as it may be termed, which is in line with the openings in the interrupted conduits or ducts, and which serves to support and guide the rods and cables in their passage across the box.

It further consists in certain other details of construction, which will be hereinafter described, and more particularly pointed out in the claims.

Figure 1:
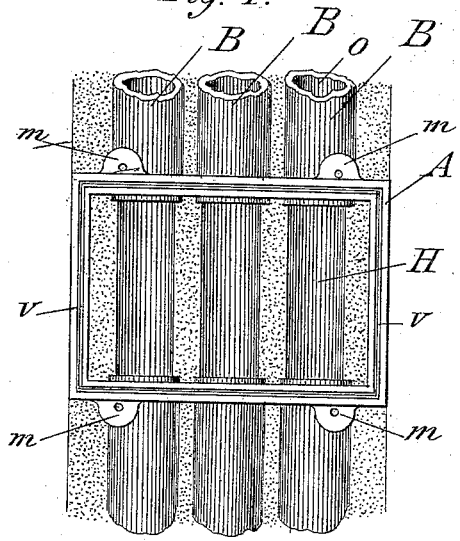
Figure 2:
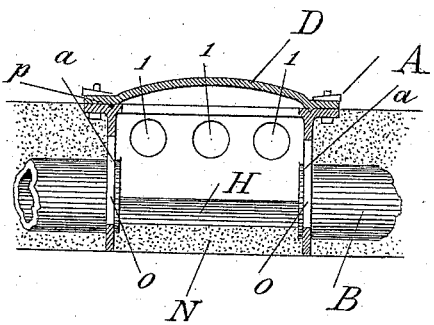
Figure 3:
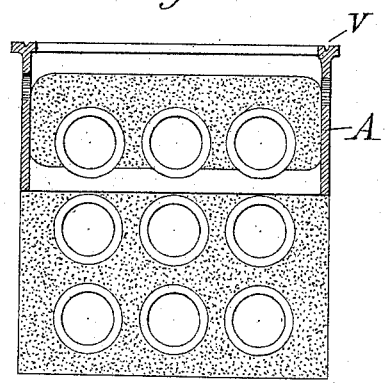
Figure 4:
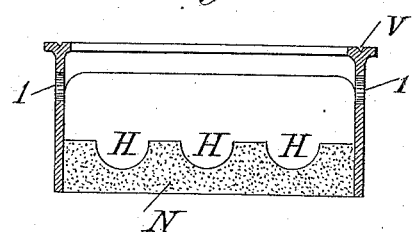
Figure 5:
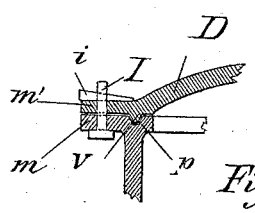

In the accompanying drawings, forming a part of this specification, Figure 1 is a plan view of my conduit system and box with the cover of the same removed. Fig. 2 is a side elevation partly in section. Fig. 3 is an end view from the interior of the box, looking toward the entering-pipes. Fig. 4 is a vertical cross-section through the box. Fig. 5 is a detail view showing mode of attaching cover.

A indicates the distributing-box, which is shown for purposes of illustration as surrounding the three upper tubes of a multiple conduit system. The box is constructed of wood, metal, or any suitable material, and may be embedded, as shown, in the system itself. The ends of the box which lie across the path of the pipes or conduits are provided with openings. (Indicated at $a\,a$.) Through these openings the pipes or conduits B B B project into the box for a short distance, as shown, the electric wires or cables being thus left without any surrounding envelope within the box, and consequently exposed so that branch connections may be readily made at this point. The branch wires are brought in through outlets (indicated at $l\,l\,l$,) conveniently located in the upper part of the sides of the box, which are parallel with the main line. These holes may be plugged up or otherwise closed when not in use.

In making the connection a tube extending to the point of consumption may be screwed into one of the outlet-holes $l\,l\,l$, or a short piece of pipe may be screwed into the same and filled with some insulating and water-proof material to prevent the ingress of water, gas, &c., into the distributing-box.

The box is further provided with a cover D, removably attached to the same in any convenient manner to permit of ready access to the interior of the box. It is important, also, that the cover should make a close joint with the sides of the box to prevent the admission of water, gas, and other impurities into the same.

In the drawings I have shown the cover as provided on its lower side with a downwardly-depending rib or flange $p$, adapted to fit into and to form a close joint with a V-shaped groove (indicated at V) extending around the upper edges of the sides of the box. The parts are clamped together in any convenient manner, as by key-bolts I passing through lugs or projections M M on the box and cover, respectively. Wedge-keys $i$ serve to hold the parts securely. For the purpose of supporting and guiding the rod or pilot in case of the introduction of the wires or cables into the system my box is provided with a false or artificial bottom, (indicated at N.) The essential characteristic of this bottom is that its upper surface shall be exactly in line with the lowest part of the openings O in the pipes, so that there will be a continuous surface through the pipes and across the box. In this construction the rod is guided across the box, entering the continuation of the pipe on the other side of the box without difficulty. If the bottom is provided with a plain upper surface, it prevents only the downward deflections of the rod or pilot. These, however, are the chief sources of annoyance, and the main purpose of my invention is attained by such a construction. I prefer, however, to further modify the bottom to prevent the sidewise as well as the downward deflections of the rod, and this I accomplish by forming troughs or hollows H H H in the upper side of the bottom corresponding with and forming continuations of the main ducts.

The false bottom now described may be made in any convenient way without departing from the spirit of my invention in this regard. It may be cast integral with the box in case the box is made of metal, or it may be shaped of wood in case of a wooden box, and so on; but preferably I form the bottom in the manner shown in the drawings.

The box is originally made with an open bottom, and is in this state embedded in the concrete of the system with the pipes entered into the open ends of the same. Semi-plastic material is then poured into the box to form the bottom thereof, and the troughs or channels L L L are formed on its upper surface in any convenient manner. These troughs are in line with the respective pipes of which they form continuations, and the bottom of the troughs are precisely on a level with the bottom of the opening O in the pipe, the sides of the trough preferably corresponding with the curvature of the pipe. In short, the troughs continue across the box, the ducts formed by the main tubes or pipe, with the exception that the upper half of the duct is removed to expose the wires and cables for the purpose of making branch connections. In case the pipe is of a different shape from that shown in the drawings the trough or channel may be similarly modified.

I term the bottom of the box an "artificial bottom" in all cases for the reason that its function is not so much to close the box as to support and guide the rod or pilot, and the position of its upper surface is fixed with reference to the main pipes regardless of the depth of the box.

In the drawings, three pipes only pass into the box, but it will be understood that the number may be increased indefinitely, and generally it will be understood that I do not by the foregoing description limit myself to the exact construction and proportion of the parts; but What I do claim is—

1. In a conduit system, a distributing-box provided with an artificial bottom adapted to support and guide the rod or pilot in its passage across the box.

2. In a conduit system, a distributing-box with an artificial bottom, the upper surface of which is provided with troughs or channels in line with the openings in the interrupted ducts and forming continuations thereof.

3. In a conduit system, a distributing-box provided with an artificial bottom molded into shape from some plastic material, and having troughs or channels on its upper surface in line with the openings in the main ducts.

4. In a conduit system, a distributing-box having end openings for the entrance of the main tubes, side openings for the branch tubes, a detachable cover, and an open bottom.

In testimony whereof I have hereunto set my hand.

EDWARD S. PEROT.

Witnesses:
FRANK MACARTHUR,
GEORGE L. WILEY.